United States Patent
Mejia et al.

(10) Patent No.: US 11,866,201 B2
(45) Date of Patent: Jan. 9, 2024

(54) METHOD AND APPARATUS FOR THE APPLICATION OF FRAME TO FUSELAGE PULL-UP FORCE VIA FUSELAGE SKIN WATERLINE TENSIONING

(71) Applicant: The Boeing Company, Chicago, IL (US)

(72) Inventors: Santiago Mejia, Charleston, SC (US); Patrick James Macko, Charleston, SC (US); Byron James Autry, Charleston, SC (US); Paul Gabriel Werntges, Charleston, SC (US); Larry Scott Smotherman, Owens Cross Roads, AL (US); David Raines, Huntsville, AL (US); Sara Murphy, Madison, AL (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 17/735,426

(22) Filed: May 3, 2022

(65) Prior Publication Data

US 2023/0356857 A1    Nov. 9, 2023

(51) Int. Cl.
*B64F 5/10* (2017.01)
*B64C 1/12* (2006.01)
*B64C 1/06* (2006.01)

(52) U.S. Cl.
CPC ............ *B64F 5/10* (2017.01); *B23P 2700/01* (2013.01); *B64C 1/061* (2013.01); *B64C 1/068* (2013.01); *B64C 1/12* (2013.01)

(58) Field of Classification Search
CPC .......... B23P 2700/01; B64F 5/10; B64C 1/12; B21J 15/142
See application file for complete search history.

(56) References Cited

U.S. PATENT DOCUMENTS 3,616,075 A * 10/1971 Jarvis ...................... B29C 43/00
156/479
4,945,488 A * 7/1990 Carver ............. G05B 19/41805
700/182

(Continued)

FOREIGN PATENT DOCUMENTS

CN     103878605 A     6/2014
CN     104309816 A     1/2015

(Continued)

OTHER PUBLICATIONS

EP Search Report dated Sep. 25, 2023 in re EP Application No. 23167699.0.

*Primary Examiner* — Michael W Hotchkiss
(74) *Attorney, Agent, or Firm* — COATS & BENNETT, PLLC

(57) ABSTRACT

A device to assemble a skin and a frame of an aircraft fuselage. The device includes first and second brace members that extend along opposing sides of a gap. Arches are spaced apart and fixedly connected to the first and second brace members and that extend across the gap. A strongback is attached to and movable along the first and second brace members with the strongback having a curved shape that matches the plurality of arches. The strongback includes clamps configured to engage with the frame. First and second tension devices apply tension to the skin at the strongback.

20 Claims, 15 Drawing Sheets

(56) References Cited

U.S. PATENT DOCUMENTS

| | | | | |
|---|---|---|---|---|
| 5,033,178 | A * | 7/1991 | Woods | B25B 11/00 29/243.57 |
| 5,231,747 | A * | 8/1993 | Clark | B21J 15/10 227/152 |
| 5,368,807 | A * | 11/1994 | Lindsay | B29C 70/44 425/389 |
| 5,560,102 | A * | 10/1996 | Micale | B23Q 35/02 29/559 |
| 5,806,797 | A * | 9/1998 | Micale | G05B 19/41805 244/131 |
| 5,896,637 | A * | 4/1999 | Sarh | B64F 5/10 227/51 |
| 6,121,781 | A * | 9/2000 | Martinez | B25B 11/005 324/661 |
| 6,170,157 | B1 * | 1/2001 | Munk | B64F 5/10 29/407.01 |
| 6,430,796 | B1 * | 8/2002 | Jones | B23P 23/00 29/34 B |
| 6,877,203 | B2 * | 4/2005 | Engstrom | B25B 11/00 29/709 |
| 7,430,792 | B2 * | 10/2008 | Linnemann | B25J 15/0061 29/33 K |
| 7,596,843 | B2 | 10/2009 | Spishak et al. | |
| 7,874,052 | B2 | 1/2011 | Schueler | |
| 8,916,010 | B2 * | 12/2014 | Brennan | B29C 70/545 156/275.5 |
| 9,051,062 | B1 * | 6/2015 | Boone | B29C 65/7841 |
| 10,029,414 | B2 | 7/2018 | De Mattia | |
| 10,500,736 | B2 * | 12/2019 | Häntzschel | B29C 66/9121 |
| 10,814,488 | B2 * | 10/2020 | Tombe | B64C 3/182 |
| 10,894,616 | B2 | 1/2021 | Davis et al. | |
| 11,034,464 | B2 | 6/2021 | Hirai et al. | |
| 11,040,783 | B2 * | 6/2021 | Ishida | B23P 19/04 |
| 11,117,184 | B2 * | 9/2021 | Hirai | B21J 15/42 |
| 11,345,485 | B2 * | 5/2022 | Kasahara | B21J 15/42 |
| 2006/0108058 | A1 * | 5/2006 | Chapman | B64F 5/10 156/245 |
| 2006/0284047 | A1 | 12/2006 | Spishak et al. | |
| 2012/0011693 | A1 * | 1/2012 | Amirehteshami | B23P 21/002 29/33 R |
| 2014/0325813 | A1 * | 11/2014 | Batt | B64F 5/10 29/283.5 |
| 2015/0202824 | A1 | 7/2015 | De Mattia | |
| 2016/0101875 | A1 * | 4/2016 | Davis | G09B 25/02 434/72 |
| 2017/0001735 | A1 * | 1/2017 | Darras | B23K 37/0211 |
| 2018/0178894 | A1 * | 6/2018 | Guering | B64C 1/40 |
| 2019/0030588 | A1 * | 1/2019 | Hirai | B64F 5/10 |
| 2019/0031372 | A1 | 1/2019 | Hirai et al. | |
| 2019/0127088 | A1 | 5/2019 | Kasahara et al. | |
| 2019/0144134 | A1 * | 5/2019 | Kasahara | B21J 15/42 29/559 |
| 2020/0094991 | A1 * | 3/2020 | Datas | B21J 15/42 |
| 2021/0086914 | A1 * | 3/2021 | Varrelmann | B21J 15/42 |
| 2021/0171181 | A1 * | 6/2021 | Hirai | B25B 11/005 |
| 2021/0253273 | A1 * | 8/2021 | Okada | B23P 21/00 |
| 2022/0097869 | A1 * | 3/2022 | Urmston | B23Q 3/00 |
| 2022/0153434 | A1 | 5/2022 | Smith et al. | |
| 2022/0234761 | A1 | 7/2022 | Bonnefoy | |

FOREIGN PATENT DOCUMENTS

| | | |
|---|---|---|
| CN | 205834104 U | 12/2016 |
| CN | 106514343 A | 3/2017 |
| CN | 108032052 A | 5/2018 |
| CN | 108972422 A | 12/2018 |
| CN | 112405051 A | 2/2021 |
| CN | 112660412 A | 4/2021 |
| DE | 712525 C | 10/1941 |
| DE | 1010836 B | 6/1957 |
| DE | 102005002546 A1 | 8/2006 |
| JP | 3753648 B2 | 3/2006 |
| WO | 2020037341 A1 | 2/2020 |
| WO | 2020045649 A1 | 8/2021 |

* cited by examiner

METHOD AND APPARATUS FOR THE APPLICATION OF FRAME TO FUSELAGE PULL-UP FORCE VIA FUSELAGE SKIN WATERLINE TENSIONING

TECHNOLOGICAL FIELD

The present disclosure relates generally to the field of the assembly of composite panels and, more specifically, to devices and processes that apply tension to the skin of the panels during the assembly process.

BACKGROUND

The manufacturing of composite panels includes laying up fiber-reinforced composite plies on a forming tool. Each of the individual composite plies has a fiber orientation angle in which the fibers are aligned within the ply. The different composite plies can be arranged at various orientations relative to the other plies. Different types of composite plies have different design variables, such as but not limited to material and fiber orientation and ply widths. The composite plies may be oriented and sequenced in an optimal arrangement to provide the optimal structural performance. The number of composite plies and types of materials can vary depending on the expected use of the composite member. The composite plies that are stacked together are then cured to form the composite member.

After curing, the composite member is mounted to a frame that is attached to the inner side of the skin. The current assembly process requires multiple technicians to attach the frame. The process includes forming holes and inserting fasteners at the tie foot locations along the frame. The process also includes applying different forces to the skin during the attachment. Technicians are required to check the tie foot locations and door surround frame for gaps. Once completed, the frames and door surrounds are removed from the skin and shims are installed at the needed locations. The frames and door surround are then re-installed onto the skin to verify gaps and install fasteners Improvements are needed to reduce the amount of manpower required during assembly. This can include systems and methods that reduce the number of fasteners that are needed to be installed during the process and reduce the need to remove and reinstall frames multiple times during the process.

SUMMARY

One aspect is directed to a device to assemble a skin and a frame of an aircraft fuselage. The device comprises first and second brace members that extend along opposing sides of a gap. A plurality of arches are spaced apart and fixedly connected to the first and second brace members and that extend across the gap. A strongback is attached to and movable along the first and second brace members with the strongback comprising a curved shape that matches the plurality of arches. The strongback further comprises clamps configured to engage with the frame. First and second tension devices apply tension to the skin at the strongback.

In another aspect, fingers are positioned along each of the arches with each of the fingers comprising a body that is connected to one of the arches and an enlarged head at an end of the body and configured to contact against the skin.

In another aspect, each of the arches comprises a central section centered on an apex and lateral sections positioned on each side of the central section with the fingers of the arches along the central section having a fixed position and the fingers of the arches along the lateral sections being movable relative to the arches.

In another aspect, a first indexing member is connected to a first one of the arches at a first end of the first and second base members and a second indexing member is connected to a second one of the arches at a second end of the first and second base members with each of the first and second indexing members comprising a head aligned at an apex of the arch to connect to the skin and align the skin relative to the first and second base members and the arches.

In another aspect, each of the tension devices comprises an arm configured to be attached to the skin with a cylinder to apply a force to the arm and a sensor to sense the amount of force applied to the skin.

In another aspect, a control unit comprising processing circuitry is configured to receive signals from the sensors and control the forces applied to the skin by the first and second tension devices.

One aspect is directed to a method of assembling a skin and a frame of an aircraft fuselage. The method comprises: aligning the skin on a support platform and contacting the support platform against the skin at a first number of points; attaching the frame to the skin at limited points along the frame; moving a strongback along the support platform and engaging the strongback to the frame; reducing the contact between the skin and the support platform; and while the contact is reduced, applying tension to the skin at the frame.

In another aspect, aligning the skin on the support platform comprises connecting a leading edge of the skin to a first indexing member at a first end of the support platform and a connecting a trailing edge of the skin to a second indexing member at a second end of the support platform.

In another aspect, attaching the frame to the skin at the limited points along the frame comprises attaching an apex of the frame to the skin at a first point and lateral sides of the frame to the skin at second and third points and with a remainder of the frame being unattached to the skin.

In another aspect, the method further comprises detaching the lateral sides of the frame from the skin at the second and third points after engaging the strongback to the frame and prior to applying the tension to the skin.

In another aspect, the method further comprises engaging the strongback to the frame while the frame is attached to the skin at the limited points.

In another aspect, the method further comprises extending fingers of the support platform into contact with the skin; engaging the strongback to the frame while the fingers are in contact with the skin; and retracting the fingers away from the skin and then applying the tension to the skin.

In another aspect, the method further comprises applying the tension to the skin while the skin is attached to the frame at just a single connector at an apex of the frame.

In another aspect, applying the tension to the skin at the frame comprises applying the tension at sides of the skin.

One aspect is directed to a method of assembling a skin and a frame of an aircraft fuselage with the method comprising: aligning the skin relative to a support platform with the skin comprising an arched shaped with a midpoint and opposing lateral sides that terminate at an outer edge; supporting the skin at arches that are spaced apart along a length of the support platform; securing the skin to the frame with connectors at the midpoint and at each of the lateral sides; translating a strongback that is secured to the support platform along the support platform and into contact with the frame; engaging the strongback with the frame; after engaging the frame, removing the connectors at the lateral sides; and applying tension to the skin at the lateral sides of the skin with the tension being applied at the frame.

In another aspect, the method further comprises applying the tension to the skin at just the frame.

In another aspect, aligning the skin relative to the support platform comprises connecting a first tab on a forward end of the skin to a first one of the arches on the support platform and connecting a second tab on a rear end of the skin to a second one of the arches on the support platform.

In another aspect, engaging the strongback with the frame comprises engaging clamps on the strongback to the frame.

In another aspect, the method further comprises securing the skin to the frame at just an apex of the frame while applying the tension to the skin.

In another aspect, the method further comprises securing the strongback to the support platform after engaging the strongback with the frame and prior to applying the tension.

The features, functions and advantages that have been discussed can be achieved independently in various aspects or may be combined in yet other aspects, further details of which can be seen with reference to the following description and the drawings.

DETAILED DESCRIPTION

Figure 1:
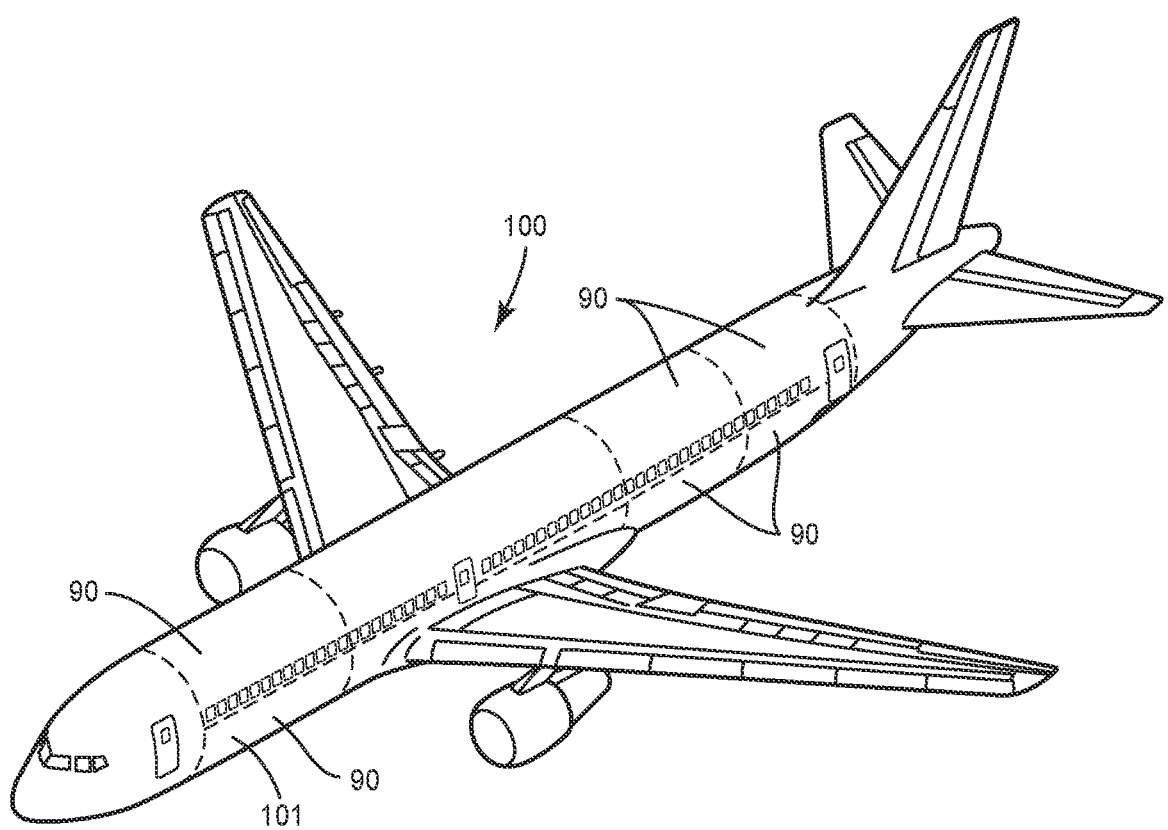
FIG. 1 is an illustration of perspective view of an aircraft that includes composite panels.

Composite panels can be used to construct a variety of different products. FIG. 1 illustrates one example of an aircraft 100 with a fuselage 101 constructed from a number of composite panels 90. The panels 90 can include a variety of different shapes and sizes. The panels 90 are individually constructed as part of the overall assembly process. Once constructed, the panels 90 are connected together to form the fuselage 101 of the aircraft 100.

The panels 90 include a skin 91 that is formed by the composite members. The panels 90 also include frames 91 attached to the inner side that support the skin. The number and positioning of the frames 91 can vary depending up the object that is being formed an the context in which the object is used.

Figure 2:
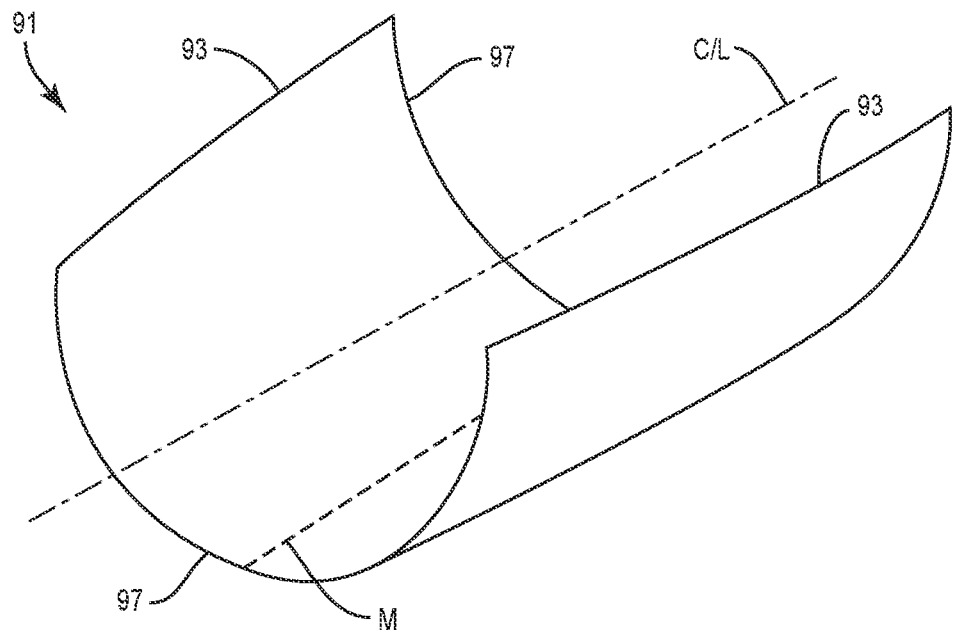
FIG. 2 is a perspective schematic view of a skin.

FIG. 2 illustrates a skin 91 formed by composite members and then cured. The composite members include one or more layers of fibers that are pre-impregnated with one or more of a thermoset and thermoplastic matrix resin (e.g., prepreg). The fibers can be formed from a variety of materials, including but not limited to aramids, polyolefins, metal, glass, carbon, boron, ceramic, mineral, and combinations. The fibers are pre-impregnated with a thermoset or thermoplastic matrix resin (e.g., prepreg). In another example, the matrix resin includes a hybrid system of both thermoset and thermoplastic. The matrix resin can be formed from a variety of substances, including but not limited to acrylics, fluorocarbons, polyamides (PA), polyethylenes (PE) such as polyethylene terephthalate (PET), polyesters, polypropylenes (PP), polycarbonates (PC), polyurethanes (PU), polyetheretherketones (PEEK), polyetherketoneketones (PEKK), polyetherimides (PEI), and other material compositions. The different types of composite plies can include a variety of thicknesses. Examples of thicknesses for each of the composite plies includes but are not limited to between about 0.0025-0.0175 inches. The skin 91 can include various numbers of layers of composite plies. Further, the fibers of one or more of the layers can be oriented in various arrangements (e.g., parallel to each other) depending upon the desired functional requirements of the panel 90.

Figure 2A:
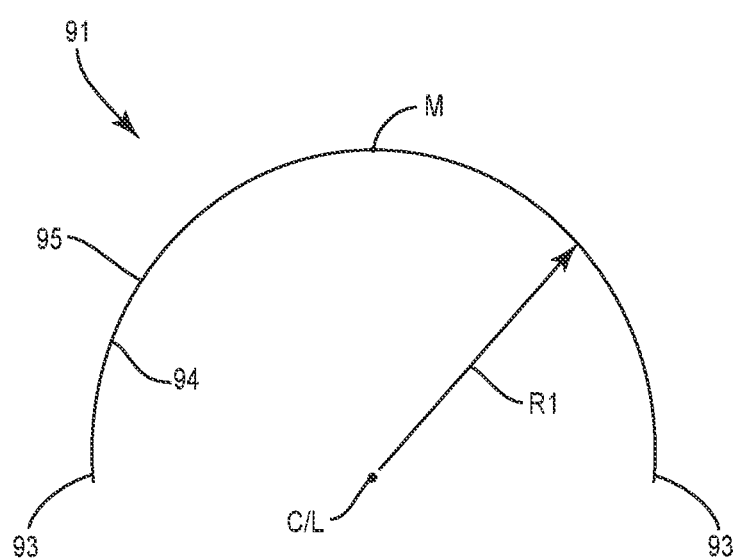
FIG. 2A is an end view of the skin of FIG. 2.

The skin 91 used for the fuselage 101 has an arced shape as illustrated in FIGS. 2 and 2A. This shape includes an overall curvature with a midpoint M that is equally spaced away from side edges 93. In one example as illustrate in FIG. 2A, the panel 90 includes a curved shape with a radius R1 from a centerline C/L. The size of the skin 91 and extent of the arc can vary. In one example, the arc extends about 180 degrees (i.e., hemispherical shape). In another example, the arc extends about 90 degrees. Other examples can include various smaller or larger sizes. The panel 90 further includes an inner side 94 and an opposing outer side 95.

Figure 3:
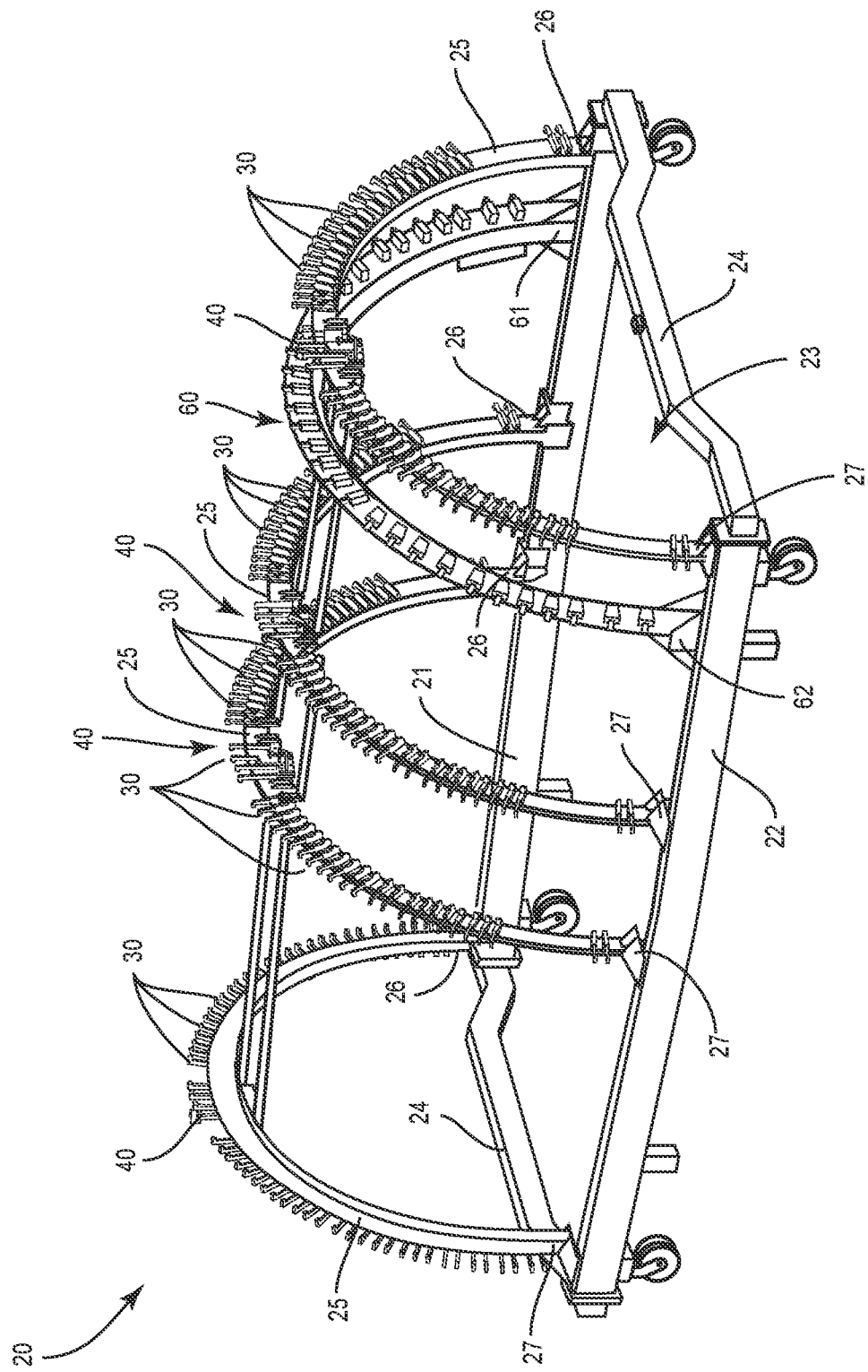
FIG. 3 is a perspective view of a support platform.

After formation, the skin 91 is placed on a support platform 20 and tensioned. One example of a support platform 20 is illustrated in FIG. 3 and includes a pair of base members 21, 22 that are spaced apart by a gap 23. Each of the base members 21, 22 includes an elongated shape that is substantially straight. One or more braces 24 extend across the gap 23 and connect to the base members 21, 22 to strengthen the support platform 20.

Arches 25 are spaced apart and connected to the base members 21, 22 along the length. The arches 25 include a first end 26 fixedly connected to the first base member 21 and an opposing second end 27 fixedly connected to the second base member 22. The arches 25 are fixed in position along the length of the base members 21, 22. The number of arches 25 along the length and the spacing of the arches 25 along the length can vary. In one example, the arches 25 are equally spaced along the length. In one example, two of the arches 25 are positioned at the longitudinal ends of each of the base members 21, 22. As illustrated in FIG. 3, a first arch 25 is at the first end of the base members 21, 22 and a second arch 25 is at the second end. In one example, each of the arches 25 of the support platform 20 includes the same shape and size. Other examples include variations in one or more of the arches 25.

Figure 4:
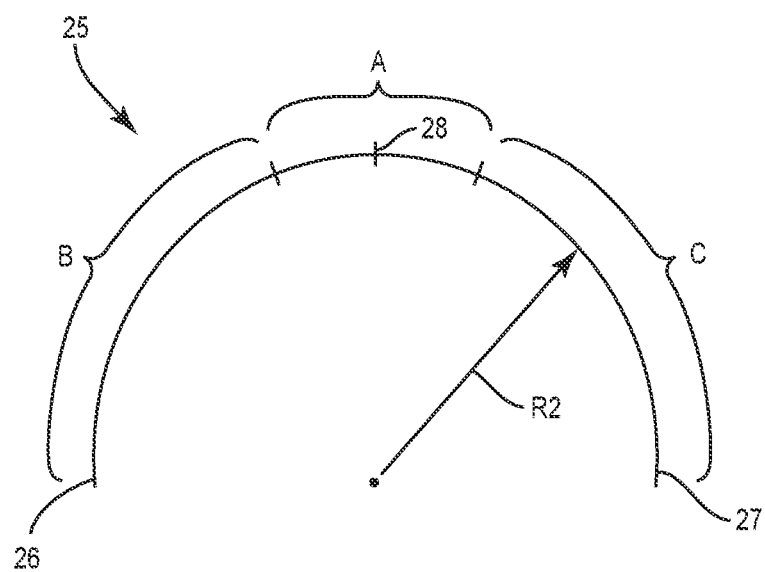
FIG. 4 is a schematic side view of an arch of a support platform.

The arches 25 have a curved shape that matches the curvature of the skin 91. FIG. 4 schematically illustrates an arch 25 having a curved shape that terminates at the ends 26, 27. The arch 25 includes a radius R2. In one example, the radius R2 is equal to the radius R1 of the skin 91. The arch 25 includes an apex 28 which in this example is at a midpoint between the ends 26, 27. The arch 25 can be divided into different sections that include a central section A that extends outward equal amounts from each side of the apex 28. The arch 25 also includes lateral sections B, C on opposing sides of the central section A. The sizes of each of these sections can vary depending upon the context.

The arches 25 are configured to support the skin 91 when the skin 91 is placed onto the support platform 20. Fingers 30 are connected to the arches 25 and extend outward beyond the arches 25 to contact against and support the skin 91. Some of the fingers 30 are adjustable relative to the arch 25 to which they are attached, with other fingers 30 being fixedly positioned relative to the arch 25 to which they are attached. In one example, the fingers 30 positioned along the central section A are fixed and the fingers 30 along the lateral sections B, C are adjustable.

Figure 5:
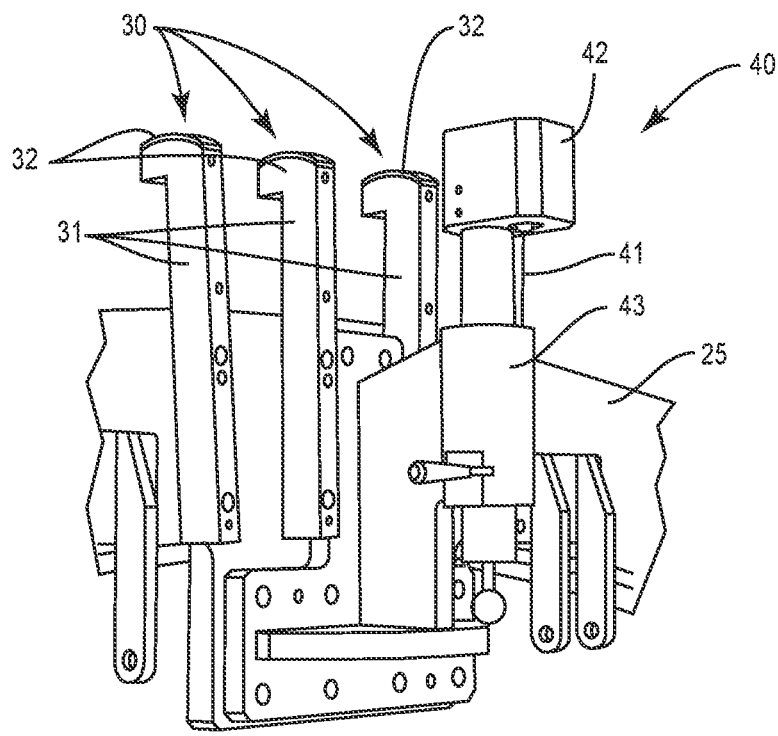
FIG. 5 is a perspective view of fingers and an indexing member attached to an arch of a support platform.

FIG. 5 illustrates a section of an arch 25 that includes fingers 30. The fingers 30 are fixedly attached relative to the arch 25 and include a body 31 that is connected to the arch 25 with one or more fasteners. A head 32 is positioned at the end of the body 31 and includes an enlarged size to contact against the skin 91. In one example, these non-movable fingers 30 are attached to the arch 25 along the central section A.

Figure 6:
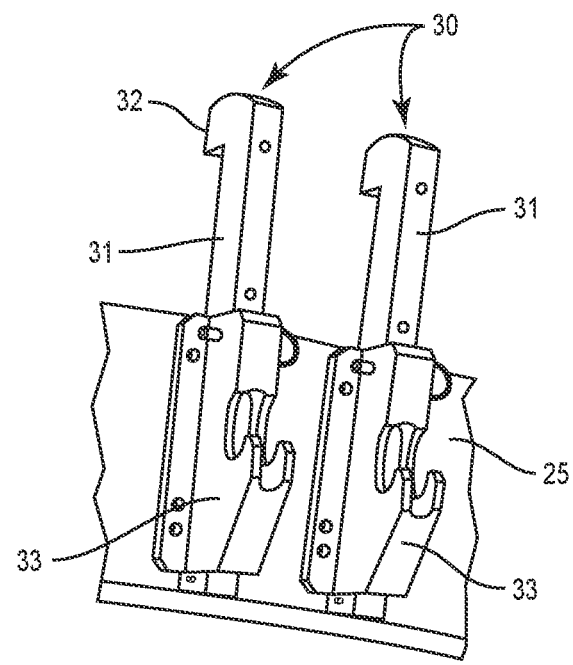
FIG. 6 is a perspective view of fingers attached to an arch of a support platform.

FIG. 6 illustrates fingers 30 that are movably attached to the arch 25. The fingers 30 includes a receptacle 33 that supports the body 31. In one example, the fingers 30 are manually adjustable such as through a ratcheting mechanism that includes a tab that engages with teeth that extend along the body 31. In another example, the fingers 30 are powered by a pneumatic system that includes a cylinder in the body 31. In one example, the positioning of the fingers 30 is controlled by a control unit 50. In one example, these movable fingers 30 are attached to the arch 25 along the lateral sections B, C.

The support platform 20 also includes one or more indexing members 40 to align the panel 90 relative to the support platform 20. In one example as illustrated in FIG. 3, indexing members 40 are positioned on the outer arches 25 (i.e., a first aft arch and a second fore arch). As illustrated in FIG. 5, the indexing member 40 includes a body 41 and an enlarged head 42. In one example, the head 42 is aligned with the apex 28 of the arch 25. The body 41 can be supported in a receptacle 43 that provides for adjusting the position of the head 42. In one example, the receptacle 43 includes a fastener that engages with the body 41 and with the fastener being rotatable to provide for adjusting the position of the head 42. In one example, the panel 90 includes a tab on the front and back edges that engage with the indexing members 40 when the panel 90 is positioned on the support platform 20.

One or more strongbacks 60 are positioned on the support platform 20. The strongback 60 is configured to support a frame 92 that is initially attached to the skin 91 during the application of the tensioning force. The strongback 60 is movable along the support platform 20 to individually support the various frames 92 that are attached to the skin 91 during the assembly process.

As illustrated in FIG. 3, the strongback 60 includes a curved shape with a first end 61 that is attached to the base member 21 and a second end 62 that is attached to the base member 22. The curved shape corresponds to the shape of the skin 91. In one example, the curved shape has a radius that matches the radius of one or more of the skin 91 and arches 25 (i.e., one or more of R1 and R2).

Figure 7:
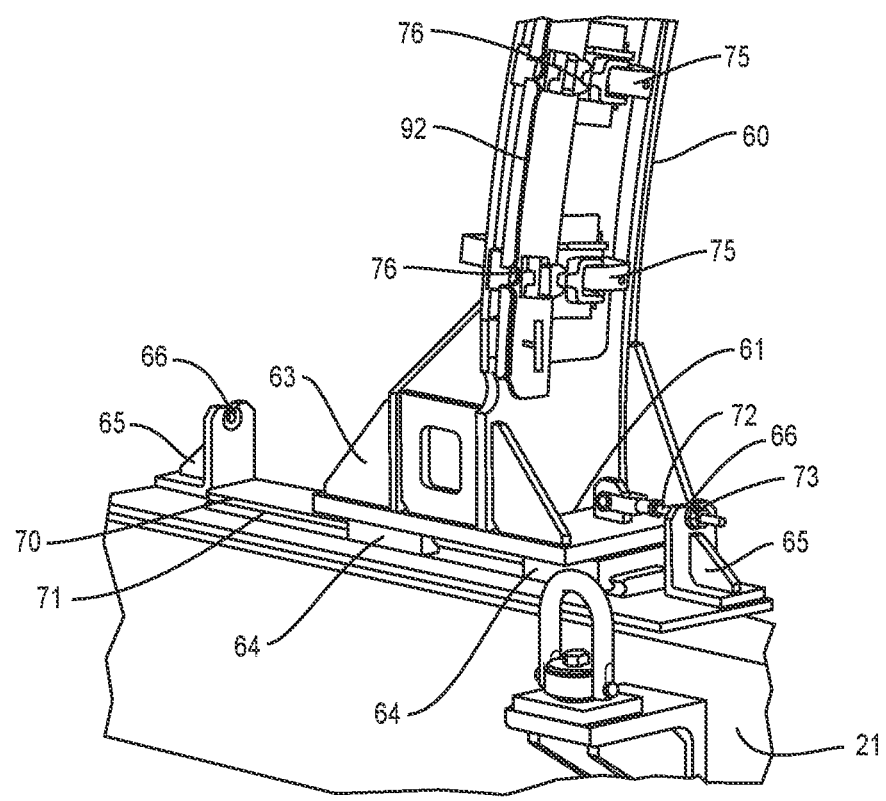
FIG. 7 is a partial perspective view of a strongback that is clamped to a frame.

The strongback 60 is movable along the length of the base members 21, 22. In one example, the ends 61, 62 engage directly with rails 70 that extend along one of the base members 21 and provides for the translating movement. In one example as illustrated in FIG. 7, each end 61, 62 is connected to a boot 63. One or more carriages 64 positioned on the bottom of the boot 63 are configured to engage with a rail 70 that extends along the base member 21, 22. In one example, the carriages 64 include extensions that ride within slots 71 on the lateral sides of the rail 70.

One or more stops 65 are mounted to the base member 21 to control the translating movement of the strongback 60. The stops 65 include a body that is mounted to the base member 21 and includes an exposed slot 66. The slot 66 is sized to receive a rod 72 that extends from the strongback 60. The position of the rod 72 within the slot 66 can be adjusted to adjust the relative position of the strongback 60 along the base member 21. FIG. 7 includes the rod 72 being threaded and with one or more members 73 mounted on the threads. Rotation of the members 73 adjusts their position along the length of the rod 72 and hence moves the strongback 60. FIG. 7 illustrates the strongback 60 with a single rod 72 that engages with a stop 65. In another example, a second rod extends from the strongback 60 and engages with the second stop 65 (i.e., the rear stop 65 as illustrated in FIG. 7). FIG. 7 illustrates one end 61 of the strongback 60 engaged with the base member 21. The second end 62 can be mounted to the base member 22 in a similar manner.

The strongback 60 is configured to engage with and support the frame 92. The strongback 60 includes actuators 75 that are connected to clamps 76 that extend along the length of the strongback 60. The actuators 75 can be controlled/positioned to position the clamps 76 between an disengaged position that is not engaged with the frame 92 and an engaged position that is secured to the frame 92. In one example, the actuators 75 are pneumatically controlled to move between engaged and disengaged positions. In another example, the actuators 75 include manual adjustments, such as a lever mechanism or fasteners that move the contact members 76 between the engaged and disengaged position. FIG. 7 illustrates the actuators 75 in the engaged position with the clamps 76 secured to the frame 92 that is being supported by the strongback 60.

Figure 8:
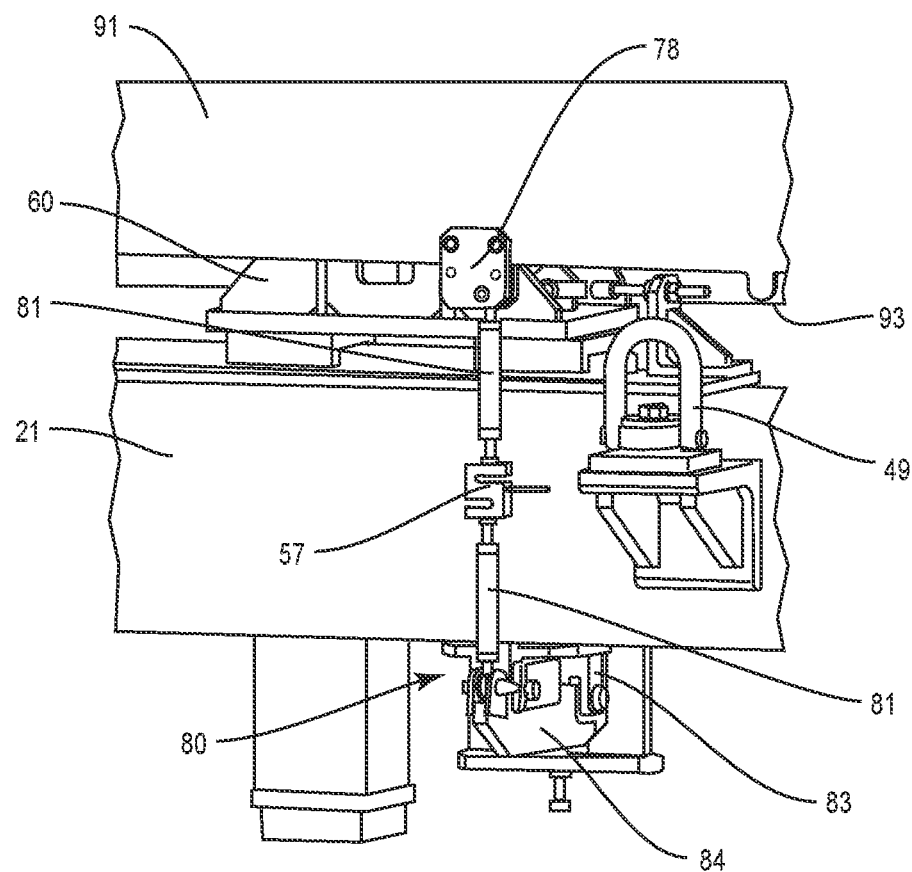
FIG. 8 is a perspective view of a tension device secured to a side edge of a skin.

As illustrated in FIG. 8, tensioning devices 80 apply a tensioning force to the skin 91 when the skin 91 is aligned on the support platform 20. In one example, a pair of tensioning devices 80 are positioned at the strongback 60 to apply tensioning simultaneously to opposing side edges 93 of the skin 91. The tensioning device 80 is connected to the skin 91 by a bracket 78 that is mounted at the side edges 93. The bracket 78 includes a pair of opposing plates that are clamped with one or more fasteners onto the skin 91. An arm 81 extends between and connects to the bracket 78 and a pneumatic cylinder 83. The arm 81 can be a single member, or multiple separate members that are operatively connected together. The pneumatic cylinder 83 is mounted to the base member 21 or strongback 60 and applies a force to the arm 81 through a lever arm 84 that applies the tension to the skin 91. In one example, the pneumatic cylinder 83 is mounted to the arm 81 through a separate lever arm. A sensor 57, such as a load cell, senses an amount of force that is being applied to the skin 91. In one example, the force is referred to a waterline tension force because the force is applied to the side edges 93 of the skin 91. The force is applied in a downward direction away from the midpoint M of the skin that is aligned at the apex 28 of the arches 25. In one example, the cylinder 83 is connected to an air supply that provide air to control the applied forces.

Figure 9:
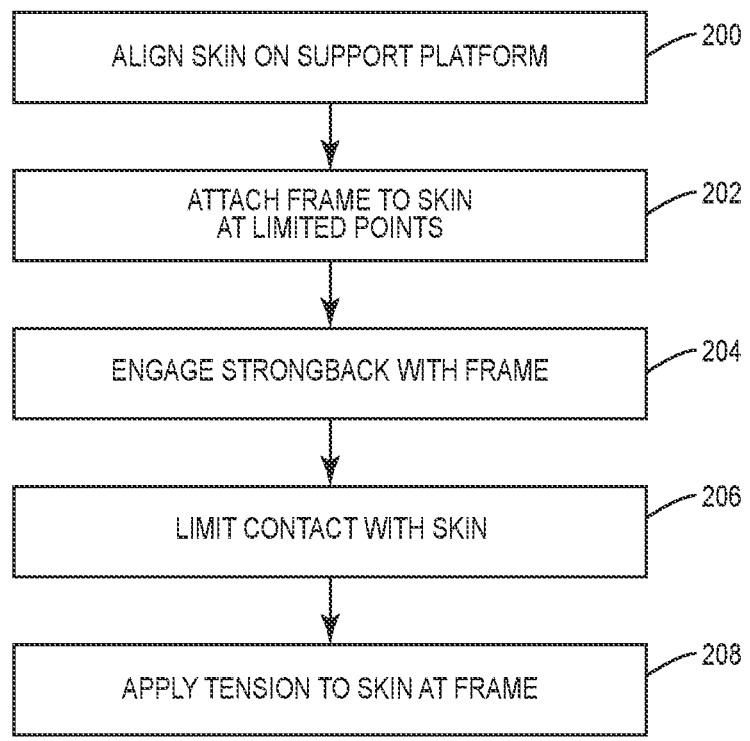
FIG. 9 is a flowchart diagram of a method of tensioning a skin on a support platform.

FIG. 9 illustrates a method of applying a tensioning force to the skin 91 to assemble the skin 91 and frame 92. The method includes aligning the skin 91 on the support platform 20 (block 200). The frame is attached to the skin at limited point along the length of the frame 92 (block 202). The strongback 60 is moved along the support platform 20 and engages with the frame 92 (block 204). Once the strongback 60 is engaged, the amount of contact with the skin 91 is reduced (block 206). The tension force is then applied to the skin 91 at the frame 92 (block 208).

The assembly of the panel 90 can include attachment of a single frame 92 or can include attachment of multiple frames 92. For multiple frames 92, the separate frames 92 are attached individually during separate steps of the total assembly process. These multiple steps can include the same strongback 60 used to support the different frames 92 and/or two or more strongbacks 60 used to support the different frames 92 at the different locations.

Figure 10:
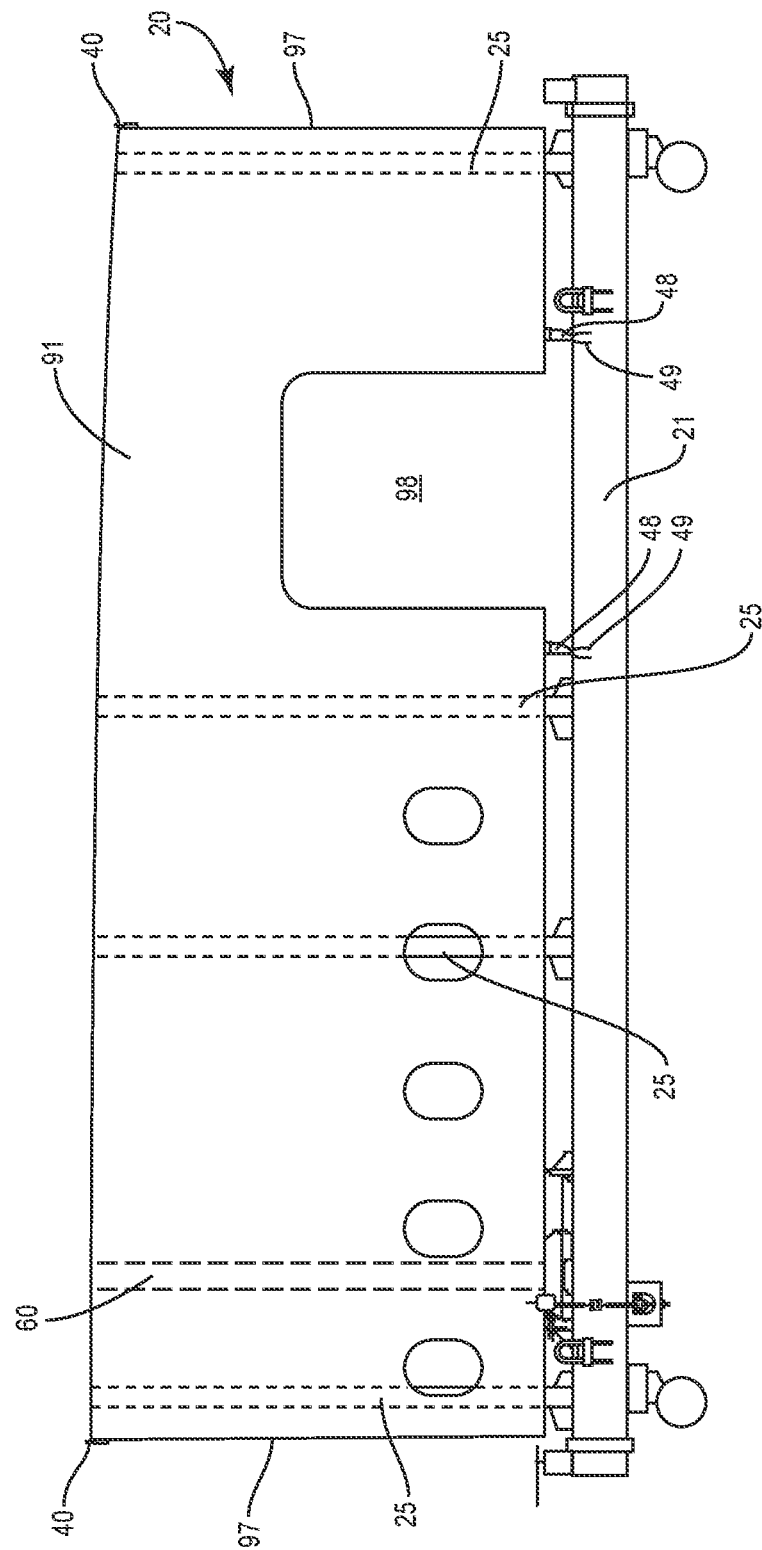
FIG. 10 is a side view of a first step of an assembly process.
Figure 11:
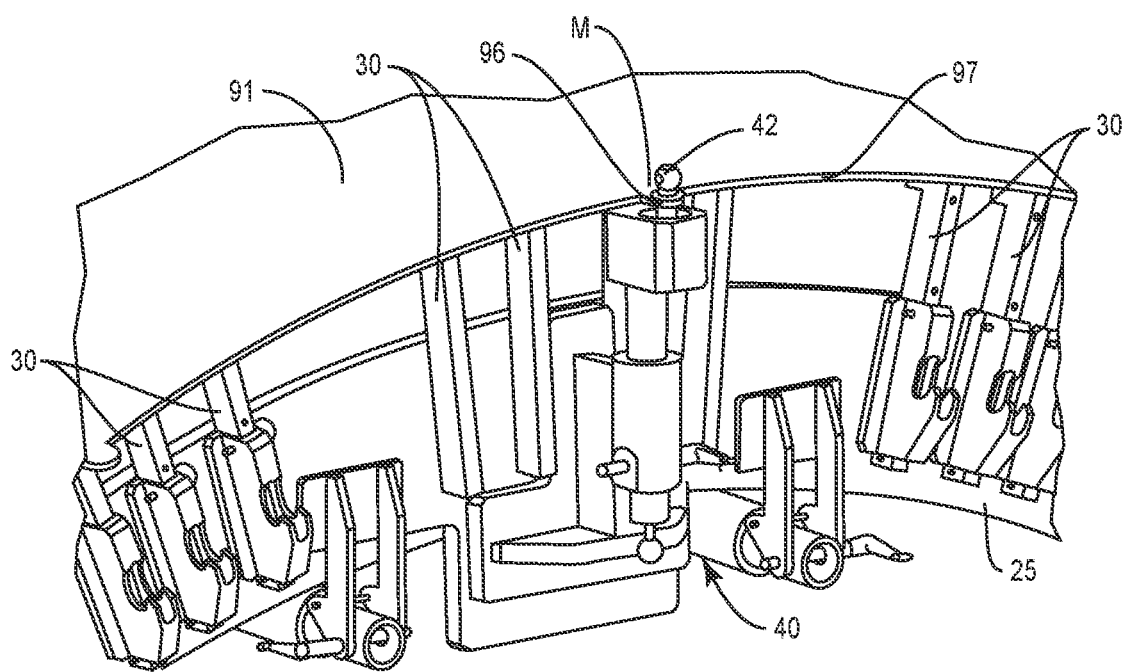
FIG. 11 is a perspective view of a tab attached to an indexing member.

FIGS. 10-15 illustrate more detailed steps of the process of forming the panel 90 with by attachment of the frame 92 and tensioning the skin 91. As illustrated in FIG. 10, the skin 91 is positioned on the support platform 20. Prior to positioning the skin 91 on the support platform 20, the fingers 30 on the arches 25 along the lateral sections B, C are retracted. The fingers 30 along the central section A remain extended. The skin 91 is positioned on the support platform 20 and aligned through the indexing members 40 on the support platform 20. In the example of FIG. 10, the indexing members 40 are positioned at the forward and aft arches 25. In one example as illustrated in FIG. 11, the skin 91 includes tabs 96 that extend outward from the forward and aft ends 97 at the midpoint M. Each of the tabs 96 is sized to extend over the head 42 of the indexing member 40. This positioning aligns the skin 91 relative to the support platform 20.

After the skin 91 is aligned with the indexing members 40, the fingers 30 along the lateral sections B, C are extended to contact against the inner side 94 of the skin 91. Thus the fingers 30 along each of the sections A, B, C are extended to contact against and support the skin 91.

One or more points along the sides 93 of the skin 91 can be secured to the support platform 20 with clamps 48. Each of the clamps 48 is mounted to the skin 91 at the side 93 and connect to anchors 49 on one of the base members 21, 22 (see FIG. 8). In one example as illustrated in FIG. 10, clamps 48 secure the skin 91 to the base member 21 at a door cutout 98.

With the skin supported by the support platform 20, the strongback 60 is able to move along the base members 21, 22. In one example, each strongback 60 is configured to move along the length between adjacent arches 25. In another example, the strongback 60 is able to move past the arches 25 and thus can move along the entire length of the skin 91.

Figure 12:
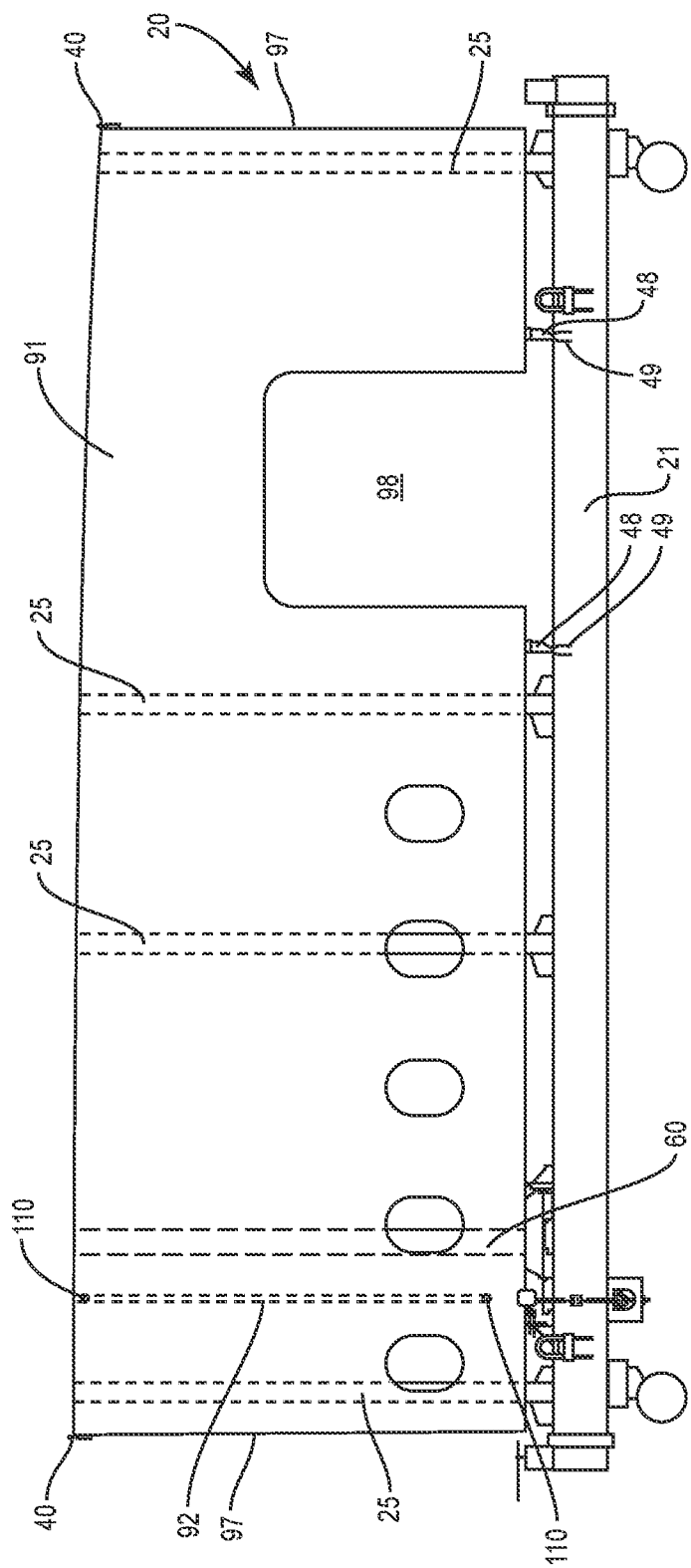
FIG. 12 is a side view of a frame positioned on an inner side of a skin and a strongback spaced away from the frame.

After the skin 91 is aligned on the support platform 20, a frame 92 is aligned along the inner side 94 of the skin 91 as illustrated in FIG. 12. The frame 92 is positioned on the inner side 94 of the skin 91. In one example, the frame 92 is a single, unitary construction that extends between opposing sides 93 of the panel 90. The frame 92 may extend to and be aligned with the side edges 93 or may be positioned inward from the side edges 93. The frame 92 includes an arched shape that substantially matches the shape of the arches 25 and strongback 60.

The frame 92 is initially positioned away from the strongback 60. With the frame 92 positioned, the skin 91 is attached to the frame 92 at a limited number of points. In one example, the frame 92 is connected to the skin 91 with connectors 110 at three points. A first connector 110 attaches the skin 91 to the frame 92 at the midpoint M of the skin 91. Connectors 110 further attach the skin 91 to the frame 92 along each of the lateral sides. The connectors 110 provide for temporary connection of the frame 92 to the skin 91. In one example, the connectors 110 are CLECO connectors available from Apex Tool Group. Various other types of removable connectors may also be used for the connections.

Figure 13:
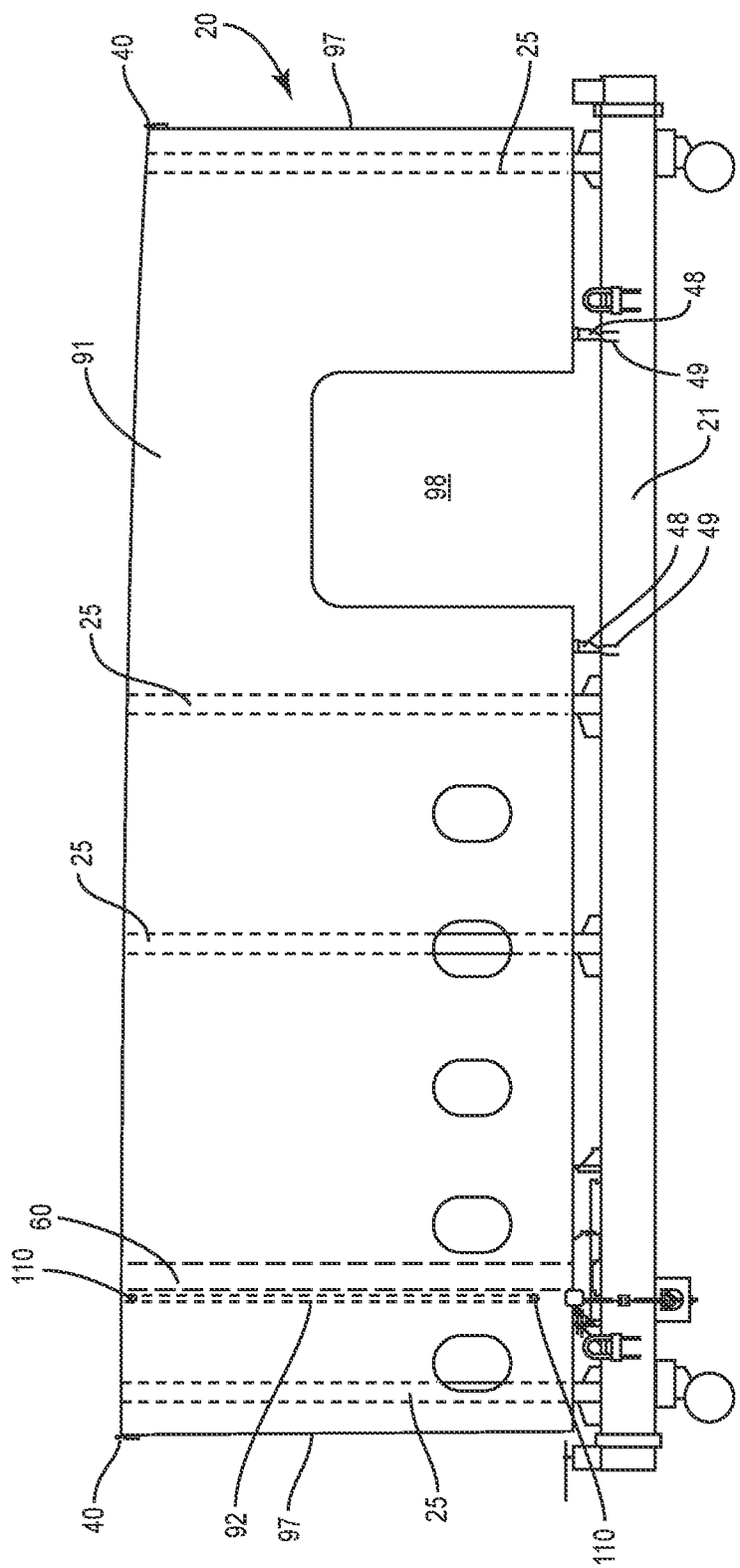
FIG. 13 is a side view of a frame positioned on an inner side of a skin and a strongback engaged with the frame.

As illustrated in FIG. 13, the process continues with the strongback 60 translated along the base members 21, 22 and into engagement with the frame 92. The clamps 76 on the strongback 60 are engaged and connect to the frame 92. The strongback 60 is further locked in position along the base members 21, 22. In one example, this locking includes securing one or more of the stops 65 on the strongback 60 that provide the relative positioning with the base members 21, 22. After the strongback 60 is engaged with the frame 92 and locked in position, the connectors 110 along the lateral sections are removed. The connector 110 at the midpoint M remains to connect the skin 91 to the frame 92.

At this point in the process, the skin 91 is supported at each of the arches 25, at the frame 92, and at the lower side edges 93 at the door cutout 98. The skin 91 remains engaged with each of the indexing members 40 at the outer ends of the support platform 20.

Figure 14:
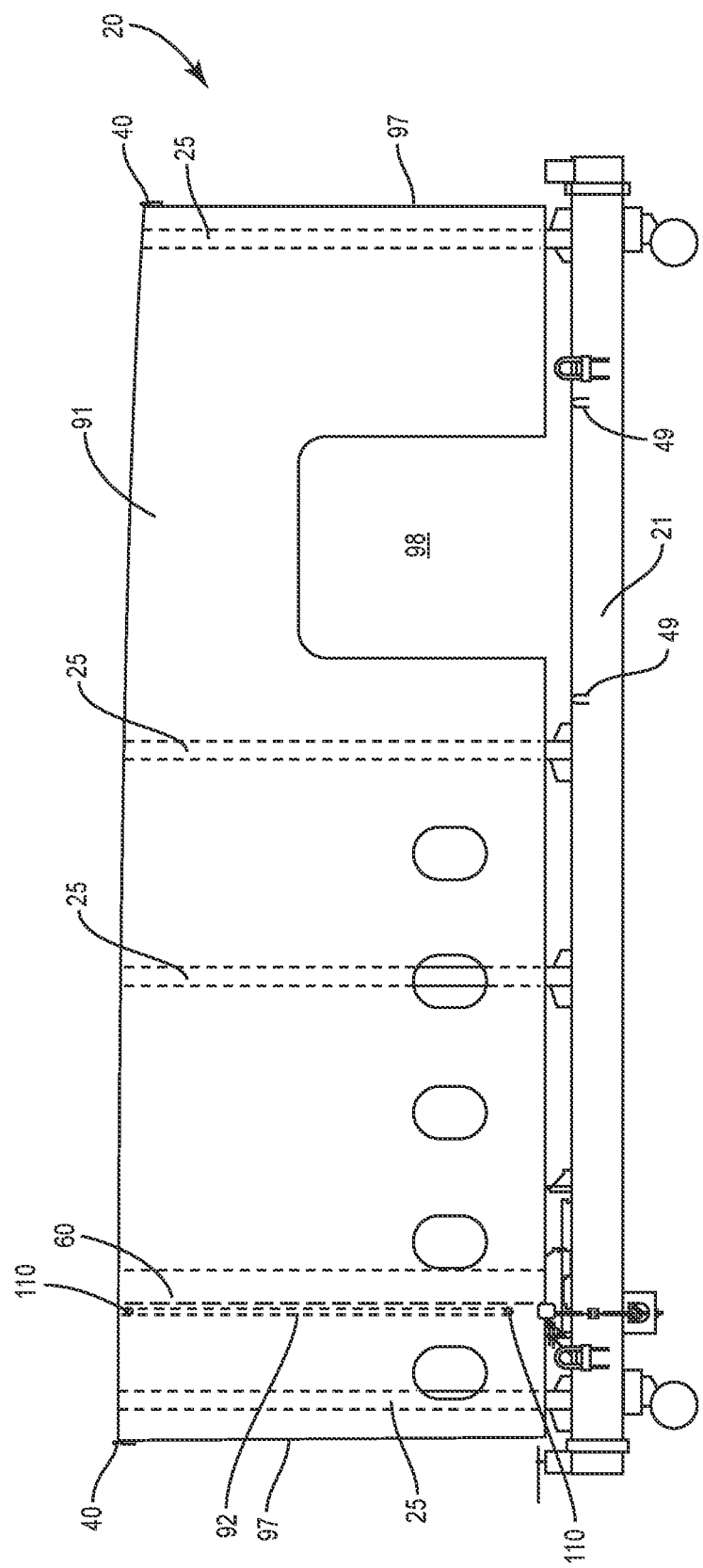
FIG. 14 is a side view of a frame positioned on an inner side of a skin and a anchors removed from the skin.

The retractable fingers 30 on some of the arches 25 are retracted away from the skin 91. In one example, this includes retracting the retractable fingers 30 along each of the arches except for an end arch 25. The non-retractable fingers 30 of the arches 25 remain in contact with the skin 91. This includes contact of the fingers 30 along the central section of the skin 91 at the midpoint M of the skin 91. In one example, the retractable fingers 30 adjacent to and forward from the door cutout 98 along the arch 25 are extended and contact against the skin 91. The frame 92 continues to be secured to the strongback 60 by the clamps 76. In one example as illustrated in FIG. 14, the clamps 48 at the door cutout 98 are removed.

Figure 15:
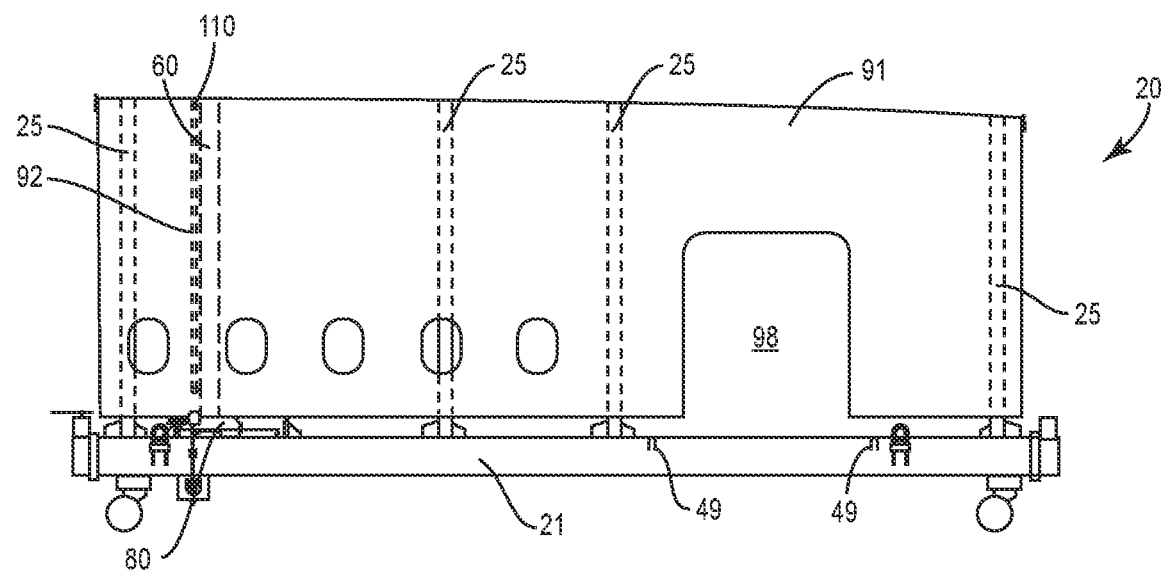
FIG. 15 is a side view of a frame positioned on an inner side of a skin and withing tensioning forces applied to the skin.

Tension is then applied to the skin 91 as illustrated in FIG. 15. Tension devices 80 are attached to each of the sides 93 of the skin 91 at the frame 92 and at the strongback 60. The connector 110 at the midpoint M remains attached while the tension forces are applied. Further, the frame 92 is held in place by the strongback 60 while the tension forces T are applied. The tensioning devices 80 can incrementally apply the tension forces T. In one example, the amount of tension force T applied to each side edge 93 is up to about 2000 lbs.

Figure 16:
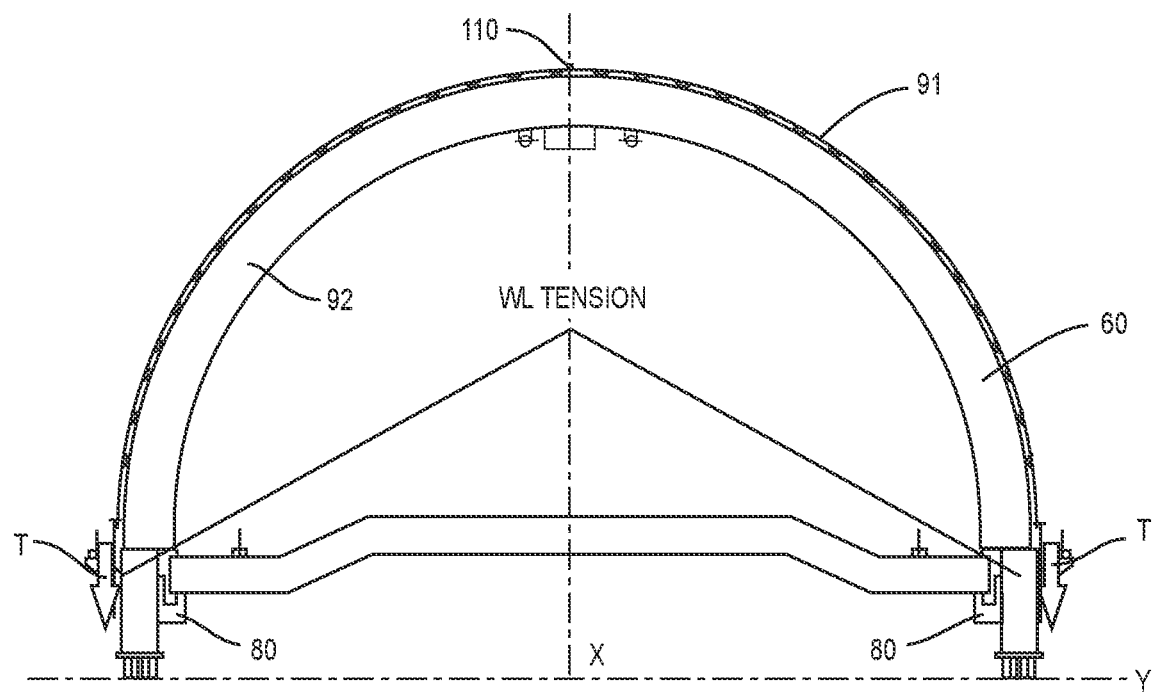
FIG. 16 is a schematic end view of the tensioning forces of FIG. 15 applied to the skin.

As illustrated in FIG. 16, the tensioning forces are applied in a downward direction T. This force is applied away from the connector 110 at the top of the skin 91. The tensioning force provides for the skin 91 to conform to the frame 92 and reduce or eliminate gaps that could form.

Figure 17:
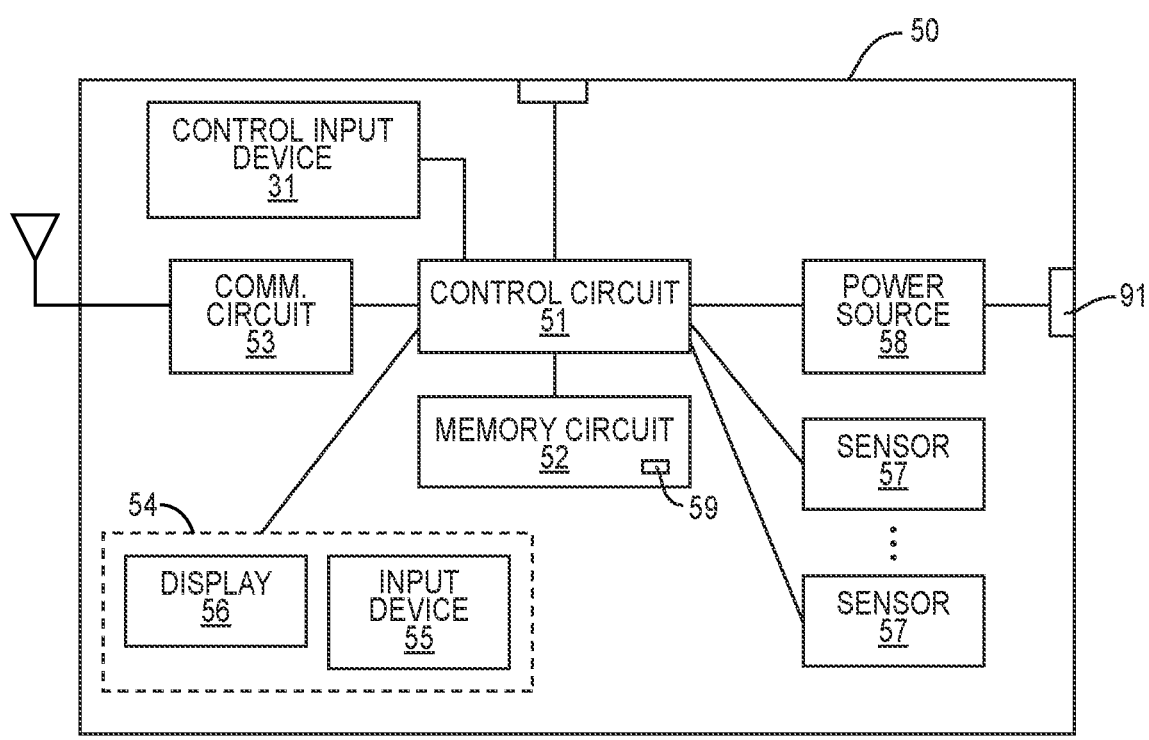
FIG. 17 is a schematic diagram of a control unit.

In one example, a control unit 50 controls the overall operation of application of the tension forces to the skin 91 by the tension devices 80. The control unit 50 can be positioned at the support platform 20 or can be positioned remotely away from the support platform 20. As illustrated in FIG. 17, the control unit 50 includes a control circuit 51 and a memory circuit 52. The control circuit 51 controls the overall operation according to program instructions 59 stored in the memory circuit 52. The control circuit 51 can include one or more circuits, microcontrollers, microprocessors, hardware, or a combination thereof. Memory circuit 52 includes a non-transitory computer readable storage medium storing program instructions 59, such as a computer program product, that configures the control circuit 51 to implement one or more of the techniques discussed herein. Memory circuit 52 can include various memory devices such as, for example, read-only memory, and flash memory. Memory circuit 52 can be a separate component as illustrated in FIG. 17 or can be incorporated with the control circuit 51. Alternatively, the control circuit 51 can omit the memory circuit 52, e.g., according to at least some embodiments in which the control circuit 51 is dedicated and non-programmable.

The control unit 50 is configured to provide for communication functionality for an operator the is performing the process. Communications can include both incoming and outgoing communications. A communications circuit 53 provides for this communication functionality. The communications circuit 53 enables communication between user devices and remote entities over a communication network.

In one example, control commands are entered remotely through the communication circuit 53. Additionally or alternatively, the control unit 50 includes a user interface 54 to control one or more aspects of the tensioning process. The user interface 54 can include one or more input devices 55 such as but not limited to a keypad, touchpad, roller ball, and joystick. The one or more input devices 55 provide for the user to enter commands to the control circuit 51. The user interface 54 can also include one or more displays 56 for displaying information.

One or more sensors 57 detect different aspects of the process. The data from the one or more sensors 57 can be stored in the memory circuit 52. One or more sensors 57 detect the physical amount of force that is being applied by the tension device 80. One or more sensors 57 can detect forces exerted on the skin 91 and can include but are not limited to one or more strain gauges and pressure sensors. In one example, the sensor 57 is a load cell. A power source 58 provides power to the control unit 50. The power source 58 can include various configurations, including but not limited to batteries.

After the tension has been applied to the skin 91 at the frame 92, the skin 91 can be tensioned at one or more additional locations. In one example, the next tensioning process is applied to a different location along the length of the skin 91 and using a different strongback 60. In another example, the same strongback 60 is used and includes the strongback 60 being detached from the frame 92 at the first location, moved to a second location along the skin 91, and used to position and support a second frame 92.

In one example, the control circuit 51 receives inputs from sensors 57 associated with the tensioning devices 80 on the opposing sides of the skin 91. The control circuit 51 adjusts the forces applied by the tension devices 80 on the opposing sides of the skin 91 to balance the waterline tension (i.e., balance the forces applied to the left and right sides of the skin 91). The control circuit 51 receives inputs from sensors 57 that detect the applied tension to the skin to adjust the tensioning as necessary. In one example, the control unit 51 controls the inputs to the air cylinders 83 on the opposing sides to adjust the tensioning and provide for the tensioning to be self-balancing.

After the tensioning of the skin 91, the frame 92 can be permanently attached to the skin 91. The permanent attachment can occur through one or more fasteners and adhesives. In one example, the attachment can occur prior to additional tensioning of the skin 91 at different locations along the length. In another example, the skin 91 is tensioned at multiple locations and then the frames 92 are applied.

The examples described above are directed to a fuselage 101 for an aircraft. The tensioning process can also be used to make other members for a wide variety of vehicles. Examples of vehicles include but are not limited to unmanned aircraft, manned spacecraft, unmanned spacecraft, manned rotorcraft, unmanned rotorcraft, satellites, rockets, missiles, manned terrestrial aircraft, unmanned terrestrial aircraft, manned surface water borne aircraft, unmanned surface water borne aircraft, manned sub-surface water borne aircraft, unmanned sub-surface water borne aircraft, automobiles, and trucks, and combinations thereof.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of assembling a skin and a frame of an aircraft fuselage, the method comprising:
   aligning the skin on a support platform and contacting the support platform against the skin at a first number of points;
   attaching the frame to the skin at limited points along the frame comprising attaching an apex of the frame to the skin at a first point and lateral sides of the frame to the skin at second and third points and with a remainder of the frame being unattached to the skin;
   moving a strongback along the support platform and engaging the strongback to the frame;
   reducing the contact between the skin and the support platform; and
   while the contact is reduced, applying tension to the skin at the frame.

2. The method of claim 1, wherein aligning the skin on the support platform comprises connecting a leading edge of the skin to a first indexing member at a first end of the support platform and a connecting a trailing edge of the skin to a second indexing member at a second end of the support platform.

3. The method of claim 1, further comprising detaching the lateral sides of the frame from the skin at the second and third points after engaging the strongback to the frame and prior to applying the tension to the skin.

4. The method of claim 1, further comprising engaging the strongback to the frame while the frame is attached to the skin at the limited points.

5. The method of claim 1, further comprising:
   extending fingers of the support platform into contact with the skin;
   engaging the strongback to the frame while the fingers are in contact with the skin; and retracting the fingers away from the skin and then applying the tension to the skin.

6. The method of claim 1, further comprising applying the tension to the skin while the skin is attached to the frame at just a single connector at the apex of the frame.

7. The method of claim 1, wherein applying the tension to the skin at the frame comprises applying the tension at sides of the skin.

8. A method of assembling a skin and a frame of an aircraft fuselage, the method comprising:
   aligning the skin relative to a support platform with the skin comprising an arched shaped with a midpoint and opposing lateral sides that terminate at an outer edge;
   supporting the skin at arches that are spaced apart along a length of the support platform;
   securing the skin to the frame with connectors at the midpoint and at each of the lateral sides;
   translating a strongback that is secured to the support platform along the support platform and into contact with the frame;
   engaging the strongback with the frame;
   after engaging the frame, removing the connectors at the lateral sides; and
   applying tension to the skin at the lateral sides of the skin with the tension being applied at the frame.

9. The method of claim 8, further comprising applying the tension to the skin at just the frame.

10. The method of claim 8, wherein aligning the skin relative to the support platform comprises connecting a first tab on a forward end of the skin to a first one of the arches on the support platform and connecting a second tab on a rear end of the skin to a second one of the arches on the support platform.

11. The method of claim 8, wherein engaging the strongback with the frame comprises engaging clamps on the strongback to the frame.

12. The method of claim 8, further comprising securing the skin to the frame at just an apex of the frame while applying the tension to the skin.

13. The method of claim 8, further comprising securing the strongback to the support platform after engaging the strongback with the frame and prior to applying the tension.

14. A method of assembling a skin and a frame of an aircraft fuselage, the method comprising:
   aligning the skin relative to a support platform;
   supporting the skin at arches that are spaced apart along the support platform;
   connecting the skin to the frame at limited points along the skin with the limited points comprising a first connection within a central section that includes an apex, a second connection within first lateral section that extends between the central section and a first end of the skin, and a third connection within a second lateral section that extends between the central section and a second end of the skin;
   connecting a strongback that is movably connected to the support platform to the frame;
   after connecting the strongback to the frame, removing the second and third connections and applying tension to the skin at the frame.

15. The method of claim 14, further comprising spacing the strongback away from the frame while connecting the skin to the frame.

16. The method of claim 14, further comprising connecting the skin to the frame with a first connector at the first connection, with a second connector at the second connection, and with a third connector at the third connection.

17. The method of claim 14, further comprising positioning the first connection at the apex of the frame.

18. The method of claim 14, further comprising applying the tension to the skin while the skin is attached to the frame at just the apex of the frame.

19. The method of claim 14, further comprising applying the tension to the skin at just the frame.

20. The method of claim 14, further comprising moving the strongback along the support platform and into contact with the frame prior to applying the tension.

\* \* \* \* \*